Dec. 11, 1934.   G. L. SHERWOOD   1,984,000
LIQUID LEVEL INDICATOR
Filed Nov. 10, 1930   2 Sheets-Sheet 1
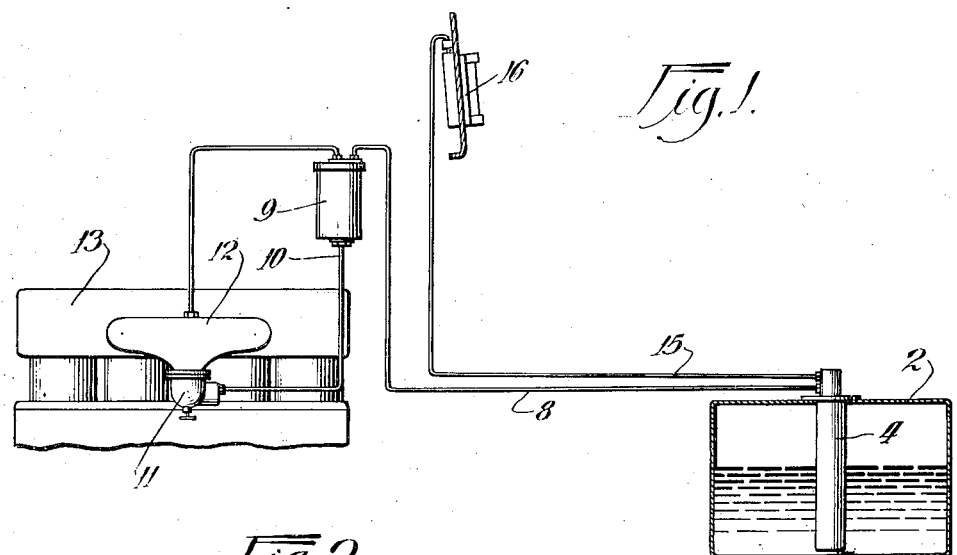
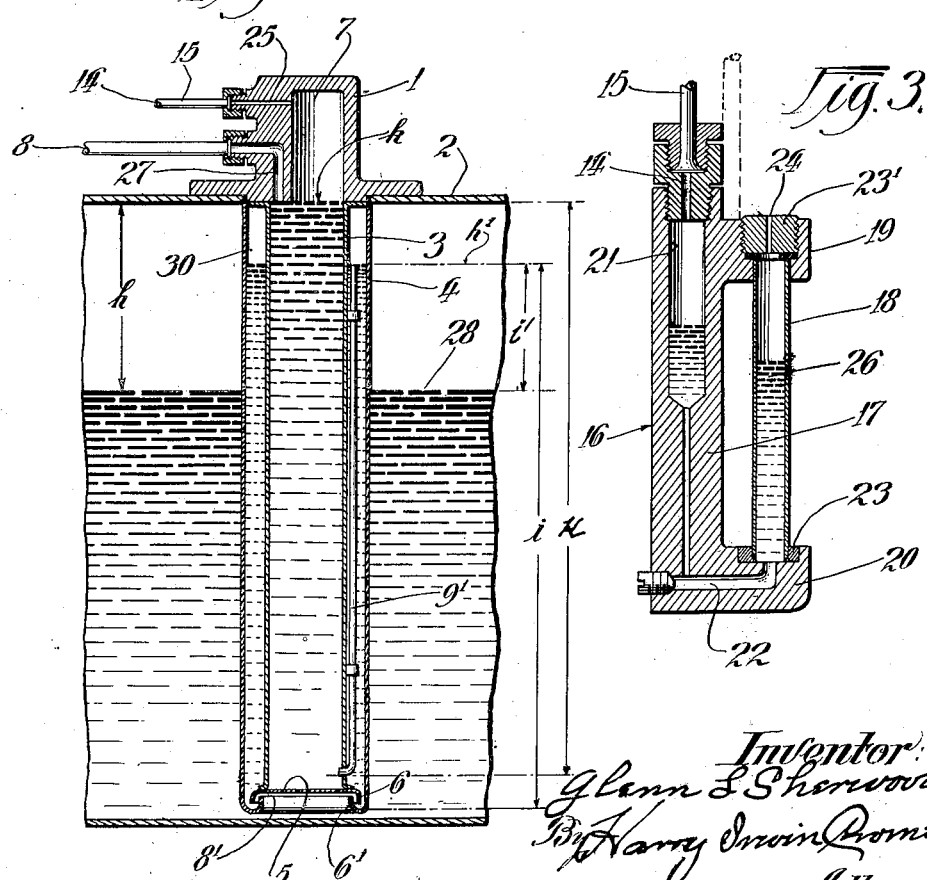

Dec. 11, 1934.  G. L. SHERWOOD  1,984,000
LIQUID LEVEL INDICATOR
Filed Nov. 10, 1930  2 Sheets-Sheet 2
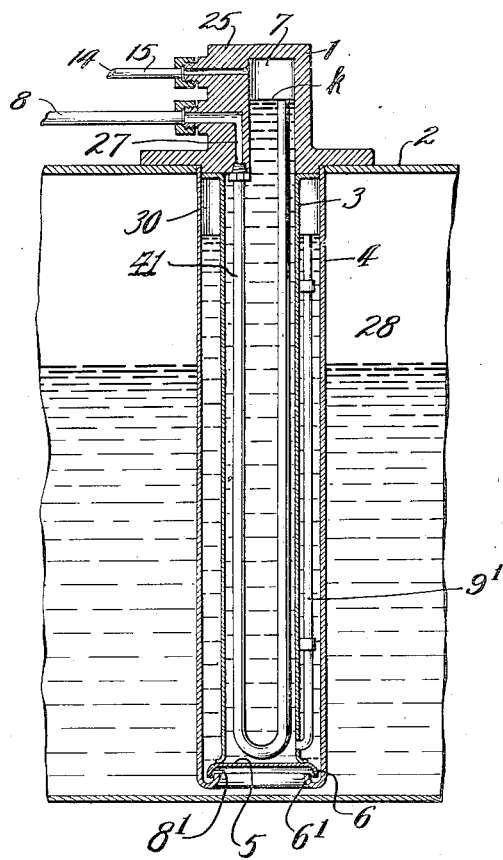
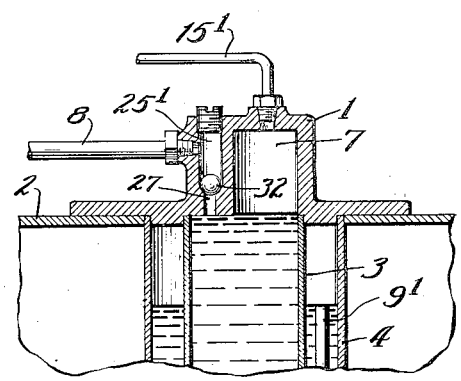
Inventor:
Glenn L Sherwood
By Harry Irwin Romer,
Attorney.

Patented Dec. 11, 1934

1,984,000

UNITED STATES PATENT OFFICE 1,984,000

LIQUID LEVEL INDICATOR

Glenn L. Sherwood, Niles, Mich., assignor of one-half to Alfred T. Lyman, Chicago, Ill.

Application November 10, 1930, Serial No. 494,662

10 Claims. (Cl. 73—54)

This invention relates to that class of hydrostatic gauges which are adapted to be used for measuring or indicating liquid levels or the depth or quantity of liquid contained in reservoirs, such, for example, as storage or supply tanks of motor vehicles, or other containers.

The principal object of the invention is to provide a simple, economical and efficient hydrostatic gauge or liquid level indicator.

A further object of the invention is to provide an improved hydrostatic gauge adapted to be connected in a fuel line leading from the fuel tank to a vacuum tank or pump for supplying liquid fuel to an internal combustion engine, or other vacuum-producing means, for indicating the liquid level or measuring and registering the depth or quantity of liquid contained in such tank or container; and more particularly, to provide simple and efficient means for maintaining the accuracy of such a gauge or liquid level indicator during the continuance of the operation of the engine or other suction means and regardless of slight leakage at some point or points along the fuel line.

It is one of the objects of my invention to provide an improved arrangement of gauging means in which the indications are effected through the medium of fluid under pressure below normal atmospheric pressure, whereby the effect of leakage in the suction line is minimized.

It is another object of my invention to provide an improved construction of the type specified arranged so that when the liquid in the tank becomes exhausted so as to permit air to be sucked up through the fuel line the gauge reading shows an increased suction effect thereon corresponding to a considerably increased hydrostatic head.

A further object of the invention is to provide an improved hydrostatic gauge adapted to give a distinct warning when the liquid in the tank is nearly exhausted.

Other and further objects of the invention will appear from the following description and claims and from an inspection of the accompanying drawings, which are made a part hereof.

The invention consists in the features, combinations, details of construction and arrangement and mode of operation of the parts as herein described and claimed.

In the accompanying drawings:

Figure 1 is a diagrammatic view showing my improved hydrostatic gauge operatively connected with a storage or supply tank, and with the fuel supply line, including a vacuum tank and carburetor, an intake manifold of an internal combustion engine, and a registering device or indicator adapted to be mounted on the dashboard of a motor vehicle;

Fig. 2 is a view in central vertical section of the tank unit, including a tubular depending portion located within the tank, and a head located outside of and secured to the tank and adapted to be operatively connected by suitable passages with the fuel supply line and registering device, respectively;

Fig. 3 is a view in central vertical section of a registering device or indicator adapted to be connected with the tank unit shown in Fig. 2, or with either of the modifications shown in Figs. 4 and 5, respectively;

Fig. 4 is a detail view in central vertical section of the upper portion of a modified form of the device shown in Fig. 2, showing a check valve in one of the passages, which communicates with the vacuum fuel line or vacuum producing means; and Fig. 5 is a view in central vertical section of another modified form of the tank unit or device shown in Fig. 2.

In constructing an improved hydrostatic gauge or liquid level indicator for measuring and registering the depth and quantity of liquid in accordance with my invention, I provide a tank unit comprising a head 1, which is adapted to be secured to the top wall or cover of a storage or supply tank 2 by any ordinary suitable securing means. To the head 1 is attached, by preference, a pair of concentric depending tubes 3 and 4 which extend downward on the inside of the supply or storage tank 2 from the head 1— to which the upper ends of said tubes are soldered or otherwise tightly secured—to the lower extremity of said tank. (See Fig. 2.) The inner tube 3, which is upright and surrounded by the tube 4, is sealed at its lower end by an end plate 5 having a depending annular marginal flange 6 which overlaps and is spaced apart from an inner upwardly extending annular flange 6' on the bottom open end of the outer tube 4 forming a liquid seal or trap 8'. The upper end of said inner tube 3 is tightly secured to the head 1, and a vacuum chamber 7 is thus formed by said head and tube. An upright tube 9' is attached to the inner tube 3 at or near its bottom end, and extends upward from its point of attachment inside of the tube 4. The upper end and mouth of the tube 9' is below the level of the top of the tube 4 so as to provide an annular air-containing vacuum chamber 30 in the upper extremity of said tube 4 above the mouth of the tube 9'.

A feed tube 8 leads from the vacuum chamber 7 to the interior of the vacuum chamber of the usual vacuum tank 9, or to a pump or other suitable vacuum-forming or suction-producing means. A fuel supply pipe 10 leads from the tank 9 to a carburetor 11, which may be of any ordinary and well known or suitable form, and is connected with the intake manifold 12 of an internal combustion engine 13 to be supplied with liquid fuel from the chamber or supply tank 2. A flexible tube 15 leads from the upper extremity of the vacuum chamber 7 to an indicator or gauge 16, which is adapted to be mounted upon the instrument board of a motor vehicle, or other suitable support, for indicating the depth of liquid contained in the tank 2, or other container with which my improved gauge may be operatively connected. The gauge or indicator 16 may be of any ordinary and well known or suitable form, adapted to be actuated by a partial vacuum or variable pressure of the air or fluid contained in the vacuum chamber 7 and in the closed vacuum passage 14 formed by the tube 15 which connects said vacuum chamber with the fluid containing or vacuum chamber of said gauge 16.

The gauge or indicator 16, shown in Fig. 3, comprises a metallic frame 17 in which is mounted an upright cylindrical glass tube 18 between upper and lower forwardly projecting frame portions 19 and 20 which are adapted to support said tube in upright operative position in parallel relation to a tubular passage or tube portion 21 in or formed by the upright main body portion of the gauge frame 17. The inner tubular portion 21 is connected at its lower extremity with the lower extremity of the exposed glass tube 18 by a connecting passage 22 in the gauge frame. The bottom end or mouth of the connecting passage 22 opens into the lower end of the glass tube 18 which is seated and tightly sealed in a suitable seat in the bottom frame arm 20. The upper end of the tube 18 is securely held in position in the upper frame arm 19 by a screw plug 23' having a vent passage 24 therein which opens into the tube. The upper extremity of the inner tube 21, which is connected with the vacuum chamber 7 in the head 1 by the tube 15, extends to a slightly higher level than the tube 18. The connected tubular passages 21, 22 and 18 form a U-tube the upright parallel tubular arms of which are preferably of substantially equal inside diameter, being partially filled with a suitable liquid 26 which also fills the connecting passage 22. The normal level of the liquid in the tube 18 is located between the top and bottom extremities of said tube where it is visible, and is adapted to be raised and lowered by the varying difference in pressure in the tubes 18 and 21.

The arrangement is such that a unit change in the level of the liquid in the tube 18 indicates a unit change in the amount of liquid in the tank 2.

In the construction shown, the mouth of the connecting passage 27, which is an extension of the tubular passage 8 connecting the interior of the head 1 with the vacuum tank 9 or other vacuum producing means, is located at or near the lower extremity of the vacuum chamber 7 and communicates with the chamber formed by the head 1 and upper part of the tube 3 at a point somewhat below the top of the chamber 7 in the head 1 and above the level of the liquid 28 in the storage or supply tank 2.

In normal operation the action of the pump, vacuum tank or other means used to withdraw the liquid from the tank acting through tube 8 reduces the pressure in the tube 3 and chamber 7 sufficiently for drawing the liquid through the trap 8' to the top of tube 9' in tube 4 and through tube 9' into tube 3 to the level of the mouth of the passageway 27 in the head 1, which passageway communicates with the tube 8, as already described.

By properly proportioning the various elements and parts, it is apparent that the vacuum in chamber 7 will be, within practical limits, in direct proportion to the head $h$ of the liquid in the tube 3 above the general level in the tank. By properly graduating the indicating device, the change in absolute pressure or partial vacuum caused by various levels of liquid in the tank can be made to read directly in a unit of volume—for example, "gallons".

It will be noted that there is no occasion in this form of gauge, for loss of air in any of the connecting passageways between the tank unit or head 1 and the indicating device, inasmuch as the pressure in the passageways is always less than that of the atmosphere. Furthermore, any influx of air due to slight leaks or other causes would produce only a momentary and negligible drop in the liquid level in tube 3 whereupon the excess air would be carried away through tube 8 leaving the accuracy of the device unaffected by such leakage.

If tube 3 were allowed to communicate directly at the bottom with the storage tank, the gauge would normally function in the same manner as described; but when the liquid had reached a level below the bottom of tube 3, uncovering the same, then the partial vacuum in this tube would be destroyed if no means were provided for preventing the escape of the gasoline, bringing the pressure in the chamber 7 and connecting passageway up to that of the atmosphere. Inasmuch as this is practically the same pressure as that registered when the tank is full the indicator would at such time indicate a full tank when in fact the tank is nearly empty.

My improved gauge, constructed as already described, provides simple and efficient means whereby this condition is remedied effectually and satisfactorily as follows:

Under normal conditions of operation when the tank 2 contains liquid, for example as illustrated in Fig. 2, the tubes 3, 4, and 9' provide a suction passage doubling back and forth on itself for carrying liquid from the tank 2 to the tube 8.

When the level of the liquid in tank 2 reaches the bottom of tube 4, a supply of liquid is still maintained in the trough provided by the flange 6' serving as a liquid seal for the opening into the tank. Upon continued operation of the engine, air instead of liquid is drawn through the liquid seal at the trap 8' into the tube 4 and upwardly into the chamber 30. This reduces the vacuum in chamber 30, allowing the liquid in the tube 4 to drop to a point slightly below the upper end of the tube 9' and allowing air instead of liquid to enter the tube 9' so as to pass therethrough into the chamber formed by the tube 3, serving to draw the liquid entirely out of the small tube 9'.

Inasmuch as no liquid head is present in the tube 9' when the tank 2 is empty, and since the partial vacuum is maintained in the upper portion of the tube 4 as above explained, the suction effect of the liquid in the tube 3 is added to the suction effect of the liquid in the tube 4, acting through the tube 9′, and the degree of partial vacuum in the chamber 7 is correspondingly increased. This is due to the fact that under such changed conditions the tube 9′ contains air instead of liquid.

It is now evident that when the tank 2 is empty the vacuum in the chamber 7 is equal to that required to support a head of liquid $k$ in the tube 3 from the level of the liquid in said tube to the point of attachment of the tube 9′ plus the head $i$ which is supported in tube 4 by the vacuum in chamber 30—in this instance, substantially twice that of the vacuum in chamber 30. (See Fig. 2.) Under such circumstances, the head of gasoline is maintained in the tube 4 by the vacuum therein by reason of the liquid seal at 8′ as above explained, and the head of gasoline is maintained in the tube 3 by the vacuum in said tube and the connected head 1 by reason of the liquid seal afforded by the tube 9′ which provides the sole outlet opening from the lower end portion of the tube 3 and being of sufficiently restricted size for insuring such water seal effect. As this vacuum would be much higher than any existing when liquid is present in the tank it is evident that the indicator—U-tube indicator 16, for example—would react by registering a point somewhat below the bottom of the indicator scale on the indicator 16.

The construction illustrated in Fig. 2 presupposes a pump or other means for drawing the liquid from the supply tank of such construction that there is no back flow of the liquid in tube 8 when the pumping mechanism is not operating. In certain types of vacuum tanks this is not the case and it is necessary to provide means for preventing the loss of vacuum when the vacuum providing means or pumping mechanism is not in operation. Such means is illustrated in Fig. 4, and a modification of the same is shown in Fig. 5.

In Fig. 4 is shown a modification of the device shown in Fig. 2 which is provided with a ball check-valve 32 mounted in the vacuum passage 27 of the fuel line, which passage communicates with the vacuum chamber 7 formed by the head 1 and the upper extremity of the tube 3 which is surrounded by the depending tube 4 attached to the head 1 and extending downward into the supply tank 2. The valve-controlled passage 27 in the head 1 communicates with the feed tube 8 which leads to the vacuum tank 9,—or to a fuel pump—not shown—which may be of any ordinary and well-known or suitable form and therefore is not necessary to be shown or described herein—or other vacuum-producing means, as already described in connection with the device shown in Figs 1 and 2. The check-valve 32 is thus adapted to prevent any back flow of the liquid in the tube 8 or fuel line when the pumping mechanism, or vacuum-producing means, is not in operation. In the device shown in Fig. 4, the vacuum tube 15′, which corresponds with the tube 15 shown in Fig. 2, connects the upper extremity of the vacuum chamber 7 with a gauge or indicator, such, for example, as the gauge 16, already described. The depending tubes 3 and 4 attached to the head 1, shown in Fig. 4, are, by preference, of identically the same construction as shown in Fig. 2, and already described.

In Fig. 5 is shown a modification in which the check-valve 32, shown in Fig. 4, is dispensed with, and a U-tube is employed for accomplishing the same purpose for which the check-valve 32, shown in Fig. 4, is employed.

A U-tube 41 extends downward from the head 1 inside of and to the bottom of the tube 3, and upward on the inside of said tube 3 into the vacuum chamber 7 formed by the head 1, and is connected at one end with the vacuum passage 27 and thus forms a U-shaped passage which communicates at its upper extremity with the vacuum chamber 7 and forms an extension of the vacuum passage 27, which with the tubular passage 8 serves to connect the vacuum chamber 7 with the vacuum tank 9 or other vacuum-producing means. The U-tube 41 thus forms a liquid seal and trap in the bottom of the bent portion of the tube. The fuel line is thus carried by the U-tube to the bottom of the chamber within tube 3 and then brought up to the level $k$. (See Fig. 5.) This traps the line and prevents fluctuations due to intermittent impulses of the vacuum tank when one is employed, and also insures the proper operation of the gauge when the engine is not running, or when the vacuum-producing means is not in operation.

In operation the first action of the suction from the vacuum tank or fuel pump is to create a vacuum in chamber 7 which causes the gasoline to rise in the tube 3. As soon as the gasoline reaches the level $k$, as shown in Fig. 2, it seals the bottom of the suction line and feeds into it to the vacuum tank 9 supplying the fuel to the engine in the normal manner. The vacuum in chamber 7 is now proportional to the liquid head $h$ and as the level $k$ is now automatically kept constant head $h$ will be variable dependent only upon the level of the gasoline in the tank. Therefore, a gauge—for example, indicator gauge 16, shown in Fig. 3—measuring and indicating the vacuum in chamber 7 will give correctly the level of the liquid in the tank.

From the foregoing it will be readily understood and appreciated by those skilled in the art that a hydrostatic gauge or indicator constructed in accordance with my invention, either in the form shown in Fig. 2, or in either of the modified forms shown in Figs. 4 and 5, respectively, differs radically from known devices employing fluid under pressure for controlling the indicator, in that my improved device causes the vacuum to be maintained or increased after air is drawn into the inlet tube; and it should be noted that my improved device and invention as herein described and shown, comprises means for producing a partial vacuum in a chamber—for example, the vacuum chamber 7—for drawing liquid from said tank and through said chamber 7, which communicates with both the indicator 16 and the vacuum tank or a fuel pump, said means being adapted to create in said vacuum chamber a vacuum equal to or greater than would otherwise be the normal vacuum therein when the liquid-containing tank is empty.

In the form of the device shown in Fig. 5, in which a U-tube is employed, instead of a check-valve 32 as shown in Fig. 4, the device containing the U-tube construction comprises means for producing a vacuum in the vacuum chamber 7, which vacuum is balanced with a definite head of liquid which is always equal to or greater than the possible vacuum or normal vacuum which would exist in said vacuum chamber when the liquid-containing tank is empty.

I claim:

1. In a device of the type described, the combination of a tank, a chamber extending downwardly in said tank and closed at its lower end, suction means opening into the upper end portion of said chamber for drawing liquid from the tank into said chamber, a second chamber also extending downwardly in said tank, a suction conduit connecting the lower end portion of said first-named chamber with the upper end portion of said second chamber and of such restricted size that the conduit is kept substantially filled with liquid while liquid is being drawn by a suction effect through said chambers and is kept substantially filled with air when the supply of liquid in the tank has become substantially exhausted and that when either air or liquid fills the conduit a head of liquid is normally maintained in said first named chamber by the influence of a partial vacuum therein, said second chamber opening at its lower end into the tank, a pressure responsive gauge, and means effectively connecting said gauge with the upper end portion of said first-named chamber.

2. In a device of the type described, the combination of a tank, a chamber extending downwardly in said tank and closed at its lower end, suction means opening into the upper end portion of said chamber for drawing liquid from the tank into said chamber, a second chamber also extending downwardly in said tank, a suction conduit connecting the lower end portion of said first-named chamber with the upper end portion of said second chamber and of such restricted size that the conduit is kept substantially filled with liquid while liquid is being drawn by a suction effect through said chambers and is kept substantially filled with air when the supply of liquid in the tank has become substantially exhausted and that when either air or liquid fills the conduit a head of liquid is normally maintained in said first named chamber by the influence of a partial vacuum therein, said second chamber opening at its lower end into the tank, a pressure responsive gauge, means effectively connecting said gauge with the upper end portion of said first-named chamber, and means for maintaining a liquid seal for the lower end opening of said second chamber when the liquid is substantially exhausted from the tank.

3. In a device of the type described, the combination of a tank, a chamber extending downwardly in said tank and closed at its lower end, suction means opening into said chamber at a point slightly below its upper end for drawing liquid from the tank into said chamber, a second chamber also extending downwardly in said tank, a suction conduit connecting the lower end portion of said first-named chamber with the second chamber at a point slightly below its upper end, said second chamber opening at its lower end into the tank adjacent to the bottom of the tank, a pressure responsive gauge, means effectively connecting said gauge with said first-named chamber at a point above that at which said first-named suction means is connected thereto.

4. In a device of the type described, the combination of a tank, a chamber extending downwardly in said tank and closed at its lower end, suction means opening into the upper end portion of said chamber for drawing liquid from the tank into said chamber, a second chamber also extending downwardly in said tank, a suction conduit connecting the lower end portion of said first-named chamber with the upper end portion of said second chamber and of such restricted size that the conduit is kept substantially filled with liquid while liquid is being drawn by a suction effect through said chambers and is kept substantially filled with air when the supply of liquid in the tank has become substantially exhausted, said second chamber opening at its lower end into the tank, means for maintaining a liquid seal for the lower end opening of said second chamber when the liquid is substantially exhausted from the tank, a pressure responsive gauge, and means effectively connecting said gauge with the upper end portion of said first-named chamber.

5. In a device of the type described, the combination of a tank, a chamber extending downwardly in said tank and closed at its lower end, suction means opening into said chamber at a point slightly below its upper end for drawing liquid from the tank into said chamber, a second chamber also extending downwardly in said tank, a suction tube of small bore connecting the lower end portion of said first-named chamber with the second chamber at a point slightly below its upper end, said second chamber opening at its lower end into the tank adjacent to the bottom of the tank, means for maintaining a liquid seal at the lower end opening of said second chamber when the liquid has been substantially exhausted from the tank, a pressure responsive gauge, and means effectively connecting said gauge with said first-named chamber at a point above that at which said first-named suction means is connected thereto.

6. In a device of the type described, the combination of a tank, two tubes one inside of the other extending downwardly in said tank, means for closing the lower end of the inside tube, an upwardly and inwardly turned flange on the lower end of the outer tube providing a shallow trough thereabout, flange means on the inside tube extending downwardly into said trough for providing a liquid seal for the outer tube opening, a small tube connecting the lower end portion of said inside tube with the upper end portion of said outer tube, suction means connected with the upper end portion of said inner tube for drawing liquid from the tank through said three tubes connected in series a pressure responsive gauge, and means effectively connecting said gauge with the upper end portion of said inner tube so as to be responsive to variations in fluid pressure therein.

7. In a device of the type described, the combination of a tank, a chamber extending downwardly in said tank and having a restricted opening into the tank at its lower end for providing a liquid seal for maintaining a head of liquid in the chamber under the influence of a partial vacuum therein, a second chamber extending downwardly in said tank alongside of said first named chamber and having a restricted opening therefrom near its lower end serving to provide a liquid seal for maintaining a head of liquid in said second chamber under the influence of a partial vacuum therein, a suction conduit communicating with said second chamber through said second named restricted opening effectively connecting said second chamber with the other chamber at a point a short distance below the upper end of said other chamber, a pressure responsive gauge, means effectively connecting said gauge with the upper end portion of said second chamber, and suction means opening into the upper end portion of said second chamber for drawing liquid from the tank through said conduit and said chambers.

8. In a device of the type described, the combination of a tank, a head secured on said tank and having a chamber therein, two tubes secured to said head and extending downwardly into said tank with one of said tubes located inside of the other and with said inside tube in communication with said chamber, means providing a restricted opening from the outer tube at its lower end into the tank for providing a liquid seal for maintaining a head of liquid in the tube under the influence of a partial vacuum therein, said inner tube having a restricted opening therefrom near its lower end serving to provide in effect a liquid seal for maintaining a head of liquid in said inner tube under the influence of a partial vacuum in the chamber in said head, a suction conduit communicating with said inner tube through said second named restricted opening effectively connecting said inner tube with the outer tube at a point a short distance below the upper end of said outer tube, a pressure responsive gauge, means effectively connecting said gauge with the chamber in said head, and suction means effectively connected with said communicating tube and chamber at a point below the upper end for drawing liquid from the tank through said conduit and said tubes.

9. In a device of the type described, the combination of a tank, a head secured on said tank and having a chamber therein, two tubes secured to said head and extending downwardly into said tank with one of said tubes located inside of the other and with said inside tube in communication with said chamber, means providing a restricted opening from the outer tube at its lower end into the tank for providing a liquid seal for maintaining a head of liquid in the tube under the influence of a partial vacuum therein, a suction conduit communicating with said inner tube near its lower end effectively connecting said inner tube with the outer tube at a point a short distance below the upper end of said outer tube, a pressure responsive gauge, means effectively connecting said gauge with the chamber in said head, and suction means effectively connected with said inner tube and chamber at a point below the upper end for drawing liquid from the tank through said conduit and said tubes, said suction conduit connecting said two tubes being of such restricted size as to be filled substantially completely with liquid when liquid is being drawn by a suction effect through said tubes and to be emptied substantially completely of liquid when air is being drawn in volume through said tubes by a suction effect after the supply of liquid in the tank is substantially exhausted.

10. In a device of the type described, the combination of a tank, two chambers extending downwardly alongside of each other in said tank to a point adjacent to the bottom of the tank, a suction conduit connecting said chambers and communicating with one chamber at a substantially lower point than that at which it communicates with the other chamber, means providing a liquid-sealed opening from the lower end of said other chamber into said tank whereby a head of liquid may be maintained in said other chamber under the influence of a partial vacuum therein, a pressure responsive gauge, means effectively connecting said gauge with the upper end portion of said one chamber, and suction means opening into the upper end portion of said one chamber for drawing liquid from the tank through said two chambers and said connecting conduit, said conduit being of such size that the conduit is kept substantially filled with liquid while liquid is being drawn by a suction effect through said chambers and is kept substantially filled with air when the supply of liquid in the tank has become substantially exhausted and that when either air or liquid fills the conduit a head of liquid is normally maintained in said one chamber by the influence of a partial vacuum therein.

GLENN L. SHERWOOD